United States Patent [19]

Nishimura et al.

[11] Patent Number: 4,820,014

[45] Date of Patent: Apr. 11, 1989

[54] OPTICAL CABLE

[75] Inventors: Akira Nishimura; Shuzo Suzuki, both of Kanagawa, Japan

[73] Assignee: Sumitomo Electric Industries, Ltd., Osaka, Japan

[21] Appl. No.: 160,241

[22] Filed: Feb. 25, 1988

[30] Foreign Application Priority Data

Feb. 25, 1987 [JP] Japan .................................. 62-42010

[51] Int. Cl.$^4$ .............................................. G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 4,038,489 | 7/1977 | Stenson et al. | 174/70 R |
| 4,199,224 | 4/1980 | Oestreich | 350/96.23 |
| 4,389,088 | 6/1983 | Trezequet | 350/96.23 |
| 4,401,366 | 8/1983 | Hope | 350/96.23 |
| 4,521,072 | 6/1985 | Cholley et al. | 350/96.23 |
| 4,703,998 | 11/1987 | Uchioke et al. | 350/96.23 |
| 4,744,631 | 5/1988 | Eichenbaum et al. | 350/96.23 |

FOREIGN PATENT DOCUMENTS

| | | | |
|---|---|---|---|
| 2519050 | 11/1976 | Fed. Rep. of Germany | 350/96.23 |
| 2488698 | 2/1982 | France | 350/96.23 |
| 58-86501 | 5/1983 | Japan | 350/96.23 |
| 62-89915 | 4/1987 | Japan | 350/96.23 |
| 2123164A | 1/1984 | United Kingdom | 350/96.23 |

*Primary Examiner*—William L. Sikes
*Assistant Examiner*—Frank González
*Attorney, Agent, or Firm*—Cushman, Darby & Cushman

[57] ABSTRACT

A tape and slot type optical cable having a core with groove dimensions that hold tape shaped optical fibers and also improve the transmission and mechanical strength characteristics of the optical cable. The dimensions require that for a groove having a depth $D_S$ and a width $W_S$ and a predetermined plurality n of optical fiber bundles of thickness T and width $W_T$ that the equations following equations be satisfied:

$$1.2 < (W_S/W_T) < 1.45$$

$$1.3 < (D_S/nT) < 1.55$$

6 Claims, 2 Drawing Sheets

OPTICAL CABLE

BACKGROUND OF THE INVENTION

1. Field of the Invention

This invention relates generally to the structure of high-density optical fiber cables employed in optical communication networks. More particularly, the invention relates to the configuration of grooves in the walls of the core of an optical cable having a plurality of tape-shaped optical fiber bundles therein.

2. Description of the Prior Art

One type of optical fiber cable includes one or more cores, each having grooves therein. Tape-shaped optical fiber bundles are inserted into the grooves. A tape is wrapped around each core after the optical fiber bundles are inserted into the grooves. Then, a sheath is wrapped around all of the taped cores. Dimensions of the grooves have not been previously regarded as important. Therefore, the width of each groove is typically made slightly larger than the width of each tape-shaped optical fiber bundle. The depth of each groove is made to accommodate the thickness of the number of tape-shaped bundles to be placed in the groove one on top of each other.

It has been thought that if the groove dimensions are thus selected to easily accommodate bundles to be inserted therein, that the resulting optical fiber would function well. However, it has been found that performance is affected by groove dimensions. The optical fiber bundle must have sufficient room to make moderate bends as it winds around its core without being so free as to nonuniformal twist the optical fibers of the bundle. If nonuniformal twisting occurs, transmission loss is increased and mechanical strength is decreased. If the groove dimensions are not properly selected, the optical fiber bundles are then subjected to side pressures which cause degraded performance. Also, the lifetime of the cable may be short. However, until now, no particular attention has been paid to the dimensions of the tape-shaped bundles and the grooves which accommodate the bundles in trying to prevent the deterioration of transmission signals and mechanical strength.

SUMMARY OF THE INVENTION

This invention relates to an improvement in the core of an optical cable. For an optical fiber having a grooved core with tape-shaped optical fiber bundles therein, the groove dimensions should be selected such that $$1.2 < (W_S/W_T) < 1.45$$

$$1.3 < (D_S/nT) < 1.55$$

If the dimensions are selected as set forth above, the bundles are prevented from having an irregular arrangement and the transmission and mechanical strength characteristics are also improved.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 1A:
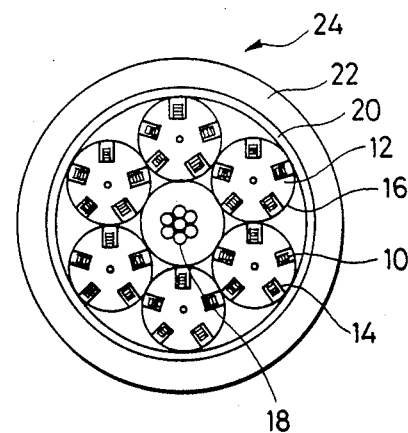
FIGS. 1(a), (b) and (c) are diagrams outlining the structure of an example of a tape and slot type optical cable according to this invention.

In FIG. 1, tape-shaped optical fiber bundles 10 are disposed in a plurality of cores 12 having grooves 14 cut in the core 12. Core tape 16, wrapped over each core 12, keeps bundles 10 disposed in the grooves 14. A central tensile strength member 18 provides support for a plurality of cores 12. Bundle tape 20 holds the plurality of cores 12 in position around tensile member 18. A sheath 22 covers bundle tape 20. This arrangement forms an optical cable 24.

Figure 1B:
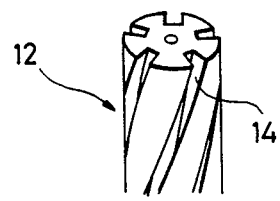

The side view in FIG. 1(b) illustrates the grooves 14 cut out of a core 12.

Figure 1C:
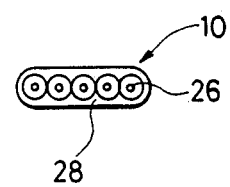

FIG. 1(c) illustrates an enlarged view of tape-shaped optical fibers 10. A plurality of optical fibers 26 are held parallel to each other and in the same plane by optical fiber cover 28.

Figure 2:
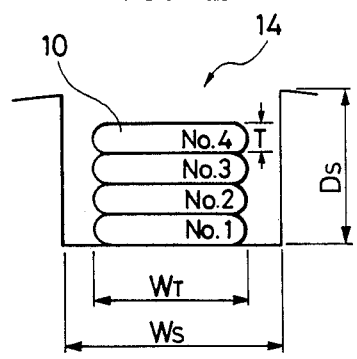
FIG. 2 is a diagram showing the structure of a part of the optical cable according to the invention.

FIG. 2 is a diagram showing the structure of each of the grooves 14 of the core 12 and the tape-shaped bundles 10 stacked in the groove 14. Reference characters $W_S$ and $D_S$ designate the width and depth of each groove 14, respectively and $W_T$ and T designate the width and thickness of each tape-shaped bundle 10 respectively. Reference character n designates the number of bundles 10 which are stacked on top of each other within groove 14.

Experiments were performed on optical cables having various groove widths and depths. The various values used are listed in Table 1.

TABLE 1

|  | No. 1 | No. 2 | No. 3 | No. 4 | No. 5 | No. 6 | No. 7 | No. 8 | No. 9 |
|---|---|---|---|---|---|---|---|---|---|
| Outside diameter |  |  |  |  | 10 mm φ |  |  |  |  |
| Groove width $W_S$ (mm) | 1.8 | 2.0 | 2.2 | 2.3 | 2.5 | 2.2 | 2.2 | 2.2 | 2.2 |
| Groove depth $D_S$ (mm) | 2.4 | 2.4 | 2.4 | 2.4 | 2.4 | 2.0 | 2.2 | 2.6 | 2.8 |
| Groove pitch (mm) |  |  |  |  | 700 |  |  |  |  |
| Central tensile strength member |  |  |  |  | 7/1.0 stranded steel wires |  |  |  |  |

The tape-shaped optical fiber bundles used are GI type having a width ($W_T$) 1.6 mm and a thickness (T) 0.42 mm and each bundle has five optical fibers. Four of these bundles were stacked on top of each other during the experiments. The tests performed on these cables and the results of these tests are listed in Table 2.

according to the invention. A single core 12 having a tensile member 30 is protected by a sheath 22. Also

TABLE 2

| Test item | Test condition | Optical unit No. | | | | | | | | |
|---|---|---|---|---|---|---|---|---|---|---|
| | | 1 | 2 | 3 | 4 | 5 | 6 | 7 | 8 | 9 |
| Were the tape-shaped optical fiber lines disordered when bent? | Bending diameter 200 mm $\phi$. Bending 180° in opposite directions ten times. | No | No | No | No | Yes | No | No | No | Yes |
| Maximum increase in transmission loss caused by bending | Bending diameter 300 mm $\phi$. Bending 180° in opposite directions five times. Transmission loss monitor, applied to the first through fifth optical fibers in No. 4 (outermost) tape-shaped optical fiber line. | 0.2 dB | 0.05 dB | 0 | 0 | 0 | 0 | 0 | 0 | 0 |
| Maximum increase in transmission loss by side pressure | Side pressure 300 kg/50 mm flat plate. Transmission loss monitor, applied to the third optical fiber in No. 4 (outermost) tape-shaped optical fiber line. | 0 dB/ 50 mm | 0 | 0 | 0 | 0 | 0.05 dB/ 50 mm | 0 | 0 | 0 |

Figure 3:
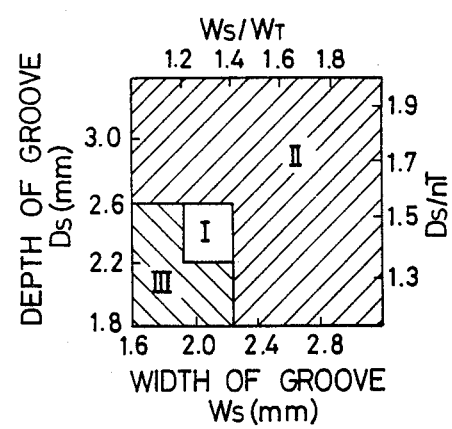
FIG. 3 is a graphical representation indicating optical cable characteristics according to groove depth.

FIG. 3 is a diagram showing acceptable bend characteristic data and side-pressure withstanding characteristic data in terms of the data of groove dimensions and optical cable characteristics of Table 2. If the groove width $W_S$ is excessively large, then the degree of freedom of the tape-shaped bundles 10 in it is so large that the tape-shaped bundles 10 may become nonuniformally twisted, if, for example, the optical cable is bent. If the groove width $W_S$ is excessively small and the optical cable is bent, the tape-shaped bundles 10 are moved in the direction in which the optical cable is bent and are pushed against the groove side and a sideward pressure is caused thus increasing the transmission loss.

If the groove depth $D_S$ is excessively large, then similarly as in the case of groove width $W_S$, the tape-shaped bundles 10 may become twisted. If the groove depth $D_S$ is excessively small, deformation by an external pressure causes increased transmission losses.

It has been determined that the optical cable characteristic is satisfactory when the groove dimensions and the tape-shaped bundle dimensions meet the following expressions:

$$1.2 < (W_S/W_T) < 1.45$$

$$1.3 < (D_S/nT) < 1.55$$

In FIG. 3, region I designates a range of groove dimensions in which the optical cable characteristic is satisfactory, region II designates a range of groove dimensions in which the tape-shaped bundles may become irregular in arrangement and region III designates a range of groove dimensions in which a bend or side pressure applied to the optical cable may result in a transmission loss.

Figure 4:
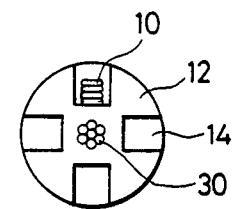
FIG. 4 is a sectional view showing the structure of another example of the tape and slot type optical cable according to the invention.

FIG. 4 illustrates another embodiment of the invention. In this embodiment, bundles 10 are placed in grooves 14 of a core 12 as in the embodiment shown in FIG. 1(a). However, each core 12 includes a tensile member 30 which runs through the center of core 12. Tensile member 30 performs the same function as tensile member 18 of FIG. 1(a). Therefore, central tensile member 18 in the FIG. 1(a) arrangement is unnecessary.

Figure 5:
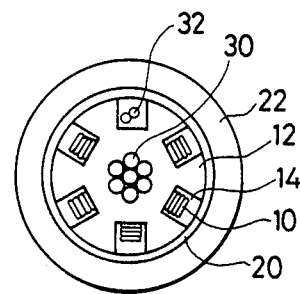
FIG. 5 is a sectional view showing the structure of another example of the tape and slot type optical cable according to the invention.

FIG. 5 is a sectional view showing the structure of another example of the tape and slot type optical cable shown in FIG. 5 is another modification in which a standard copper wire pair 32 is disposed in one of the grooves.

With respect to the optical cables shown in FIGS. 4 and 5, if the groove width $W_S$, the groove depth $D_S$, the tape-shaped optical fiber line width $W_T$, the tape-shaped optical fiber line thickness T and the number n of tape-shaped bundles in a groove satisfy the above-described equations, optical cables with satisfactory characteristics will be formed.

While the invention has been described in connection with what is presently considered to be the most practical and preferred embodiments, it is to be understood that the invention is not limited to the disclosed embodiment but, on the contrary, is intended to cover various modification and equivalent arrangements included within the spirit and scope of the appended claims.

What is claimed is:

1. An optical cable comprising:
   a predetermined plurality n of tape-shaped optical fiber bundles having a thickness T and a width $W_T$; and
   at least one core having at least one groove therein, said groove having a width $W_S$ and a depth $D_S$ satisfying the equations:

$$1.2 < (W_S/W_T) < 1.45$$

$$1.3 < (D_S/nT) < 1.55$$

said bundles being disposed in said groove.

2. An optical cable according to claim 1 further including a tape which covers said core.

3. An optical cable according to claim 2 further including an outer sheath.

4. An optical cable according to claim 3 further including a tensile member disposed through the center of said core.

5. An optical cable according to claim 1 wherein said core has at least two grooves therein, said plurality of tape-shaped optical fiber bundles being disposed in one of said grooves, said cable further including a pair of stranded copper wires disposed in said other groove.

6. An optical cable comprising:
a rod shaped tensile member;
a predetermined plurality n of tape-shaped optical fiber bundles, each of said bundles having a thickness T and a width $W_T$;
a plurality of cores, each core having at least one groove therein, said groove having a width $W_S$ and a depth $D_S$ satisfying the equations:

$$1.2 < (W_S/W_T) < 1.45$$

$$1.3 < (D_S/nT) < 1.55$$

said bundles being disposed within each of said grooves;
a tape wrapped around each core having said bundles in said grooves; and
a sheath which covers all of said cores wrapped with said tape and said tensile member.

* * * * *